(12) United States Patent
Dong et al.

(10) Patent No.: US 11,866,341 B2
(45) Date of Patent: Jan. 9, 2024

(54) ENVIRONMENTALLY FRIENDLY LARGE-SCALE PREPARATION METHOD OF FLUORIDE NANOMATERIAL

(71) Applicant: Dalian Minzu University, Liaoning (CN)

(72) Inventors: Bin Dong, Liaoning (CN); Xixian Luo, Liaoning (CN)

(73) Assignee: DALIAN MINZU UNIVERSITY, Liaoning (CN)

( * ) Notice: Subject to any disclaimer, the term of this patent is extended or adjusted under 35 U.S.C. 154(b) by 579 days.

(21) Appl. No.: 17/256,838

(22) PCT Filed: Jan. 3, 2020

(86) PCT No.: PCT/CN2020/070272
§ 371 (c)(1),
(2) Date: Dec. 29, 2020

(87) PCT Pub. No.: WO2021/134785
PCT Pub. Date: Jul. 8, 2021

(65) Prior Publication Data
US 2021/0309518 A1 Oct. 7, 2021

(51) Int. Cl.
*C01B 9/08* (2006.01)
*B82Y 40/00* (2011.01)

(52) U.S. Cl.
CPC .............. *C01B 9/08* (2013.01); *B82Y 40/00* (2013.01); *C01P 2004/64* (2013.01)

(58) Field of Classification Search
CPC ........ C01B 9/08; B82Y 40/00; C01P 2004/64
See application file for complete search history.

(56) References Cited

U.S. PATENT DOCUMENTS 5,242,670 A    9/1993   Gehringer

FOREIGN PATENT DOCUMENTS

| CN | 1749170 A | 3/2006 |
|----|-----------|--------|
| CN | 101309862 A | 11/2008 |
| CN | 101343041 A | 1/2009 |
| CN | 103224787 A | 7/2013 |
| CN | 104445373 A | 3/2015 |

OTHER PUBLICATIONS

Dong, Bin et al. "Size dependence of the upconverted luminescence of NaYF4:Er,Yb microspheres for use in ratiometric thermometry", Phys.Chem.Chem.Phys 2014, 16, pp. 20009-200012.
Wang, X. et al. "A general strategy for nanocrystal synthesis", Nature, Sep. 1, 2005, pp. 121-124, vol. 437.
Zhang, Y. et al. "Single-Crystalline and Monodisperse LaF$_3$ Triangular Nanoplates from a Single-Source Precursor", J. Am. Chem. Soc., 2005, pp. 3260-3261, vol. 127.
Wilhelm, S. "Water Dispersible Upconverting Nanoparticles: Effects of Surface Modification on Luminescence and Colloidal Stability", Nanoscale, 2015, pp. 1403-1410, vol. 7.
Homann, C. et al, "NaYF4:Yb,Er/NaYF4 core/shell nanocrystals with high upconversion luminescence quantum yield", Angew. Chem. Int. Ed. pp. 8765-8769, 2018, vol. 57.
Wang, F. et al, "Preparation of core-shell NaGdF4 nanoparticles doped with luminescent lanthanide ions to be used as upconversion-based probes", Nature Protocols, 2014, pp. 1634-1644, vol. 9, No. 7.
Mai, H., "High-Quality Sodium Rare-Earth Fluoride Nanocrystals: Controlled Synthesis and Optical Properties", J. Am. Chem. Soc., 2006, 13 pages, vol. 128-19.
Wenwu Y. "Large-scale synthesis of uniform lanthanide doped NaREF4 upconversion/downshifting nanoprobes for bioapplications", Nanoscale, 2018, pp. 11477-11484 vol. 10.

*Primary Examiner* — Timothy C Vanoy
(74) *Attorney, Agent, or Firm* — Muncy, Geissler, Olds & Lowe, P.C.

(57) ABSTRACT

A closed-loop large-scale preparation method of fluoride nanomaterial is disclosed, comprising the following steps: dissolving initial raw material into water-soluble salt by using volatile acid; evaporating the remaining acid under reduced pressure and recovering; then, adding oily organic matter with high boiling point to continue to evaporate the combined volatile acid under reduced pressure; adding an oil-soluble fluorine source to the generated oil-soluble salt; increasing the reaction temperature to increase the crystallinity of the fluoride; after cooling, separating and recovering the product and the oily organic matter; and repeating the process to realize large-scale preparation. The method uses the closed-loop process flow, does not discharge waste, and has high device yield per unit volume, low production cost and low specified asset investment. The product has the characteristics of uniform particle size and good dispersibility. The method is a user-friendly and environment-friendly large-scale preparation method of the fluoride nanoparticles.

10 Claims, 3 Drawing Sheets

ENVIRONMENTALLY FRIENDLY LARGE-SCALE PREPARATION METHOD OF FLUORIDE NANOMATERIAL

TECHNICAL FIELD

The present invention belongs to the technical field of preparation of fluoride nanomaterial, relates to an environmentally friendly large-scale preparation method of fluoride nanomaterial, and particularly relates to an efficient and environmentally friendly large-scale preparation method of fluoride nanomaterial.

BACKGROUND

Fluoride can be classified into binary fluoride (such as $MF_2$, $REF_3$, M=alkali metal, RE=rare earth and other elements) and polyfluoride (such as $MREF_4$, $M'REF_5$, M'=alkaline earth metal) according to the element types of the constituent substances. The fluoride has a wide band gap, and the absorption band is generally located in a vacuum ultraviolet region. The fluoride has no absorption in the ultraviolet region, visible region and infrared region, and can be used in the fields of laser crystals, optical device windows and optical coating. Secondly, low phonon energy of the fluoride is beneficial to reduce the non-radiation relaxation of the excited state of the activated ions and improve the luminous efficiency of the activated ions. The fluoride is an excellent substrate material for upconversion and downconversion luminescence, and is widely used in the fields of optics, biomarkers, catalysis, new light source display, imaging (such as various photographic techniques of medical radiological images), X-ray intensifying screens, detection and recording of nuclear physics and radiation field, infrared radiation detection, printing anti-counterfeiting, three-dimensional display, laser refrigeration and optical sensors.

Commercial fluoride materials are mainly prepared by a solid-phase sintering method. Prepared products have excellent performance. For example, the prepared products have high luminous efficiency and low production cost, and are suitable for large-scale production. However, the method has the disadvantages of large particle scale (micron level), uneven particle size, large morphology difference and easy agglomeration, thereby greatly limiting the application fields of the materials. The nanomaterial in the fields of biomedicine, anti-counterfeiting, three-dimensional display and optical sensors not only significantly improves the sensitivity and resolution, but also reduces the sizes of devices and further improves the application capabilities. In recent years, people have invented many preparation methods for fluoride nanomaterial. Some methods can be used to prepare fluoride nanomaterial with excellent performance, which have the advantages of high luminous efficiency, small scale, uniform particle size, uniform morphology and good dispersity. For example:

(1) Hydrothermal method: Li et al. (X. Wang, J. Zhuang, Q. Peng, Y. D. Li, A general strategy for nanocrystal synthesis, Nature, 2005, 437, 121-124) have proposed a new hydrothermal strategy based on the phase transfer separation mechanism controlled by the interface of liquid phase (such as ethanol and oleic acid), solid phase (such as sodium oleate and rare earth oleate) and solution phase (such as ethanol and water), and successfully prepared a series of monodisperse fluoride nanoparticles. The method has the disadvantage that the sample yield is extremely low, and only on the order of magnitude of 0.1 g; and the sample needs to be prepared by an ultra-high pressure process (>100 atmospheric pressure), and has very strict requirements for the device and extremely high cost.

(2) High temperature pyrolysis: Yan et al. (Y. W. Zhang, X. Sun, R. Si, L. P. You and C. H. Yan, Single-Crystalline and Monodisperse $LaF_3$ Triangular Nanoplates from a Single-Source Precursor, J. Am. Chem. Soc., 2005, 127, 3260-3261. H. Mai, Y. Zhang, R. Si, Z. Yan, L. Sun, L. You and C. Yan, High-Quality Sodium Rare-Earth Fluoride Nanocrystals: Controlled Synthesis and Optical Properties, J. Am. Chem. Soc., 2006, 128, 6426) have prepared nanocrystals by using metal organic compound of rare earth trifluoroacetate as raw material to pyrolyze the precursor at high temperature in high-boiling point non-coordinating organic solvent of octadecene and surfactants of oleic acid and oleylamine and using inert gas (generally argon) for protection. Experimental parameters, such as solvent, precursor concentration, reaction temperature and actuality, are carefully controlled to obtain high-quality rare earth fluoride nanoparticles with narrow particle size distribution and high crystallinity. The method has the disadvantage that the sample yield is also only on the order of magnitude of 0.1 g. Moreover, the method has high reaction temperature, narrow decomposition temperature range (<10° C.) and poor reproducibility, needs expensive, air-sensitive, and highly toxic rare earth trifluoroacetate precursor, and generates toxic by-products such as HF in the preparation process.

(3) High temperature coprecipitation: Liu et al. (Feng Wang, Renren Deng, Xiaogang Liu, Preparation of core-shell $NaGdF_4$ nanoparticles doped with luminescent lanthanide ions to be used as upconversion-based probes, Nature Protocols, 2014, 9, 1634, reference document 1) have used oleic acid as the end-capping ligand and octadecene as the non-coordinating solvent, synthesized the rare earth oleate precursor at about 160° C., added the methanol solution containing a fluorine source after cooling to room temperature, generated $NaYF_4$ crystal nucleus at low temperature through coprecipitation, evaporated methanol at about 80° C., then increased the temperature to about 320° C. for heat treatment, and improved crystallinity and particle uniformity by Ostwald curing method to obtain fluoride nanoparticles with controllable morphology and size.

The preparation process of the method is more environmentally friendly and safer than the above two methods, and the operability is also enhanced. However, due to the introduction of the methanol, the volume of the solution is further increased, which further reduces the sample yield, which is less than the order of magnitude of 0.1 g. In addition, the introduction of the methanol makes the preparation process more complicated, causing significant increase in the production cost. The method of expanding the capacity of a production device can increase the yield to about 2 g/batch (Stefan Wilhelm, Martin Kaiser, Christian Würth, Josef Heiland, Carolina Carrillo-Carrion, Verena Muhr, Otto S. Wolfbeis, Wolfgang J. Parak, Ute Resch-Genger, Thomas Hirsch, Water Dispersible Upconverting Nanoparticles: Effects of Surface Modification on Luminescence and Colloidal Stability, Nanoscale, 2015, 7, 1403, reference document 2). Because the solubility of the fluorine source (such as $NH_4F$) in the methanol is very low, it is necessary to add a large amount of methanol to fully dissolve the fluorine source, which will occupy about 50% of the capacity of the production device, thereby reducing the yield by half. Moreover, subsequent evaporation of the methanol takes long time, which is also extremely unsafe. The investment must be increased in security equipment, causing the increase in the cost. To solve the problems, Haase et al. (Christian Homann, Lisa Krukewitt, Florian Frenzel, Bettina Grauel, Christian Würth, Ute Resch-Genger, Markus Haase, NaYF$_4$: Yb,Er/NaYF$_4$ core/shell nanocrystals with high upconversion luminescence quantum yield, Angew. Chem. Int. Ed. 2018, 57, 8765, reference document 3) have developed a method of adding a solid sodium source (solid sodium oleate) and a solid fluorine source (solid NH$_4$F) to simplify the technological process. However, the method is extremely complicated, achieves the yield at order of magnitude of grain only, and cannot realize large-scale production. Chen et al. (Wenwu You, Datao Tu, Wei Zheng, Xiaoying Shang, Xiaorong Song, Shanyong Zhou, Yan Liu, Renfu Li and Xueyuan Chen, Large-scale synthesis of uniform lanthanide doped NaREF$_4$ upconversion/downshifting nanoprobes for bioapplications, Nanoscale, 2018, 10, 11477, reference document 4) have used solid NaHF$_2$ as the sodium source and the fluorine source to further simplify the preparation process and improve the yield. However, the method has the problem that the ratio of Na/F does not conform to the stoichiometric ratio of the product, and the cyclic production and use of the reaction reagents cannot be realized; otherwise, Na may be accumulated, so the cost is relatively high.

The above methods have used the open technical routes. The anions (such as Cl$^-$, CH$_3$COO$^-$ and CF$_3$COO$^-$) introduced in the preparation process and the solvents and surfactants such as ethanol, methanol, cyclohexane, octadecene and oleic acid added in the production process are directly discharged, instead of being recycled. Thus, these methods have complicated processes, serious pollution, high production cost and lack of large-scale production capability. These problems seriously hinder the practical application capability of the methods.

SUMMARY

In view of the above defects of the prior art, the present invention provides a preparation method which can realize large-scale production of fluoride nanomaterial.

The technical solution of the present invention is:

An environmentally friendly large-scale preparation method of fluoride nanomaterial is provided. The fluoride is MF$_2$, REF$_3$ or compound fluoride; the compound fluoride is one or more than one of AMF$_3$, AREF$_4$, A$_2$REF$_5$, A$_3$REF$_6$, ARE$_2$F$_7$, A$_2$RE$_2$F$_8$, ARE$_3$F$_{10}$, ARE$_7$F$_{22}$, A$_5$RE$_9$F$_{32}$, MREF$_5$, M$_2$REF$_7$, MRE$_2$F$_8$, MRE$_4$F$_{14}$ or REOF; M is one or more than one of Be, Mg, Ca, Sr, Ba, Zn, Cd or Mn; RE is one or more than one of La, Ce, Pr, Nd, Sin, Eu, Gd, Tb, Dy, Ho, Er, Tin, Yb, Lu, Y, Sc, Al, Ga or Bi; A is one or more than one of Li, Na, K, Rb or Cs. The method comprises the following specific preparation steps:

Step 1: taking oxide, carbonate, basic carbonate or hydroxide containing M and/or RE as raw material; adding volatile acid a to the raw material; or directly taking volatile acid salt containing M and/or RE as raw material; heating to reflux to dissolve the raw material; and converting the raw material into water-soluble salt to obtain a water-soluble salt solution b; filtering precipitates which may exist in the solution, wherein a stoichiometric ratio of the volatile acid a to the raw material is greater than 110%.

The volatile acid a is one or a mixture of more than one of hydrochloric acid, perchloric acid, hydrobromic acid, nitric acid, formic acid, acetic acid, and propionic acid.

Step 2: conducting a decompression process on the water-soluble salt solution b in step 1 to evaporate excess volatile acid a and water which do not participate in the reaction, wherein evaporation temperature is 50-130° C. and relative vacuum is −(0.01-0.09) MPa; then, adding oily organic matter c with high boiling point to continue evaporation under reduced pressure; replacing the volatile acid bound with M and/or RE, wherein evaporation temperature is 80-160° C. and vacuum is 1-3000 Pa; converting all the water-soluble salt b into oil-soluble precursor salt to obtain an oil-soluble salt solution d.

The oily organic matter c with high boiling point is one or a mixture of more than one of C$_{10}$-C$_{18}$ organic long-chain alkyl carboxylic acid and carboxylate, or one or a mixture of more than one of other organic long-chain alkyl carboxylic acid or carboxylate with melting point not higher than 30° C. and boiling point not lower than 180° C.; the addition amount of the oily organic matter c with high boiling point is 100-200 mol % of the stoichiometric ratio of M and/or RE.

Step 3: adding oil-infiltrating fluorine source e to the oil-soluble salt solution d obtained in step 2; when the product is compound fluoride, adding an oil-infiltrating compound of A, wherein the addition amount of the oil-infiltrating fluorine source e is 90%-120% of the sum of the stoichiometric ratios of A+M+RE; conducting a heating reaction at a temperature not higher than 80° C. to generate nanofluoride; then heating and crystallizing the nanofluoride under the protection of inert gas at heating temperature of 180-330° C. and reaction time of 0.5-5 h; after cooling, centrifuging and washing the product; and separating the product of fluoride nanoparticles from the oily organic matter c with high boiling point.

Generally, the reaction temperature is close to the boiling point of the oily organic matter c with high boiling point. Therefore, the reaction temperature depends on the boiling point of the added oily organic matter c with high boiling point. The oily organic matter c with high boiling point is beneficial to increase the reaction temperature, but possibly increases the particle size. When the oily organic matter c with high boiling point is one or a mixture of more than one of acid, salt corresponding to the acid, and amine corresponding to the acid, the acid is linoleic acid, oleic acid, palmitic acid, stearic acid, cetylic acid or lauric acid. At this moment, the reaction temperature can be effectively increased and the crystallization property of the prepared fluoride nanoparticles is optimal.

The oil-infiltrating fluorine source e is organic or inorganic fluoride with an infiltration angle less than 65°; and an infiltration medium is the oily organic matter c with high boiling point. The particle size of the oil-infiltrating fluorine source e is reduced through measures such as grinding. Meanwhile, a certain amount of strong polar organic solvent can be added to improve the infiltrating property. The smaller the particle size of the oil-infiltrating fluorine source e is, the better the property is. The strong polar organic solvent is organic acid, alcohol or alkali with carbon chain length not more than 2; the addition amount is not more than 10% of the volume ratio of the oily organic matter c with high boiling point; and the polarity and acid-base property must be consistent with those of the oil-infiltrating fluorine source e, so as to promote the dissociation of the oil-infiltrating fluorine source e in the oily organic matter c with high boiling point. The inorganic fluoride is one or a mixture of more than one of alkali metal fluoride (such as NH$_4$F, AF and AHF$_2$), fluoroborate and triflate; and the organic fluoride is one or a mixture of more than one of trifluoroacetic acid, salt of trifluoroacetic acid, tetramethylammonium fluoride and tetrabutylammonium fluoride.

Step 4: collecting the evaporated volatile acid a in step 2 for use in the acid dissolution process of step 1.

Step 5: collecting the oily organic matter c with high boiling point in Step 3 for use in the reduced pressure evaporation process of step 2.

In the steps 2 and 3, an inert organic solvent with high boiling point can also be added, which does not participate in the reaction process, but is only used to dilute the concentration of the reactants, which is convenient for controlling the particle size of the product and the particle growth process. The added inert organic solvent with high boiling point is one or a mixture of more than one of $C_{10}$-$C_{18}$ alkanes, amines, paraffins, high temperature silane and tri-octyl phosphine oxide.

In the step 3, inert gas such as $N_2$ or Ar is filled in the preparation process to protect the fluoride from oxidation.

The present invention has the following beneficial effects:

(1) A closed loop process flow is adopted. On one hand, by-products are reasonably and fully used. The whole process flow does not discharge waste, overcomes the defects of a conventional open production process, and is a user-friendly and environment-friendly large-scale preparation method of the fluoride nanoparticles. On the other hand, the production cost can be significantly reduced by more than 75%.

(2) The preparation process is conducted in the organic solvent to obtain uniform fluoride nanoparticles without agglomeration, which is beneficial to application.

(3) The method can also increase the yield of device per unit volume by more than 3 times, and significantly reduce device investment by 50%.

DETAILED DESCRIPTION

The present invention is further explained in detail below in combination with specific embodiments, but the protection scope of the present invention is not limited.

Figure 1:
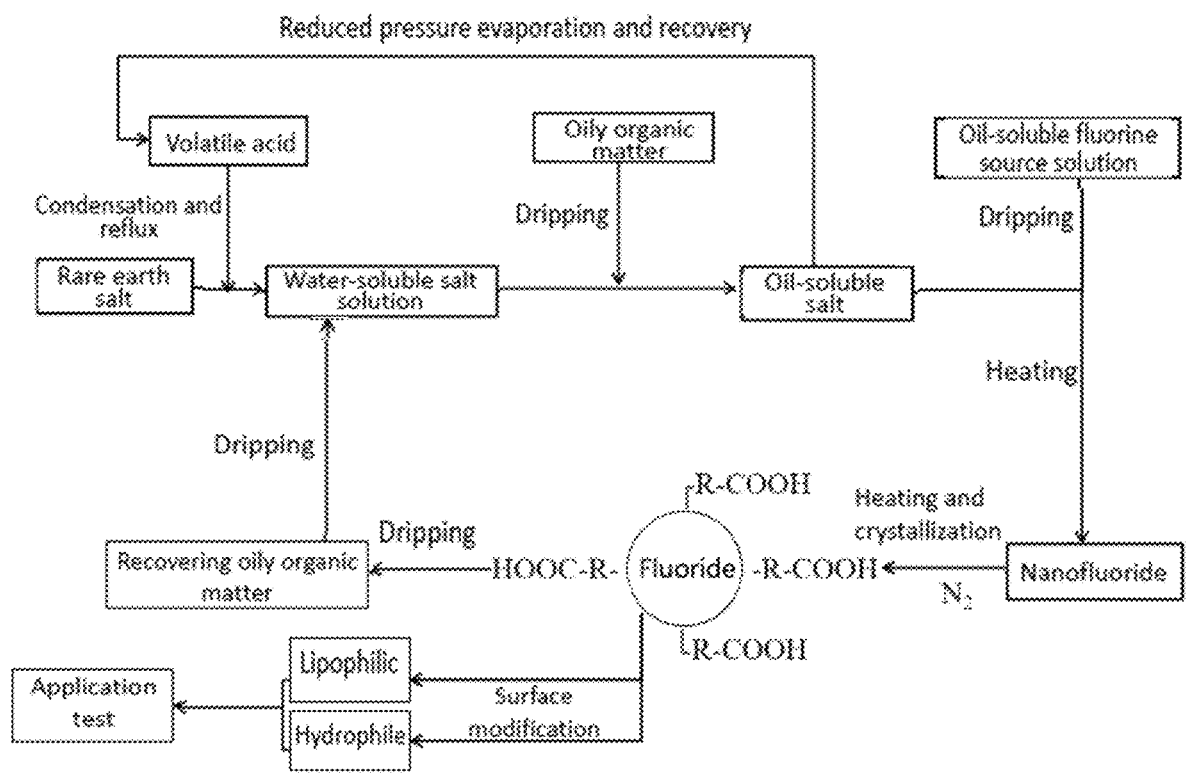
FIG. 1 is a main process flow chart of the present invention.

A process flow of an environmentally friendly large-scale preparation method of fluoride nanomaterial in the present invention is shown in FIG. 1.

Embodiment 1

(1) 1010 g of calcium carbonate (purity 99%, 10.0 mol) is dissolved in 25.0 mol of hydrochloric acid (concentration not less than 0.5 mol/L) solution; the solution is heated to about 110° C., refluxed until the solution is transparent, and filtered to remove insoluble substances.

(2) After evaporating the remaining hydrochloric acid (about 5.0 mol) under reduced pressure at 80° C. (initial relative vacuum of −0.01 MPa, and final relative vacuum of −0.09 MPa), 21.0 mol of oleic acid is added, and 12.0 mol of inert organic solvent with high boiling point, i.e., trioctylamine, is added at the same time; and the combined hydrochloric acid (about 20.0 mol) is continuously evaporated under reduced pressure at 80° C. (vacuum of 2000 Pa), and converted into calcium oleate.

(3) 100 mL of methylamine is added to 20.0 mol of $NH_4F$ powder (particle size of about 1-2 μm) and fully moistened; the above calcium oleate is transferred into the mixture, and stirred at room temperature for 1 h to generate amorphous nano-$CaF_2$; methylamine and ammonia are evaporated in vacuum at temperature not higher than 80° C. (vacuum of 10 Pa); then $N_2$ is filled; meanwhile, the reaction temperature is increased to 280° C. to react for 1 h to increase the crystallinity of the product; and after the reaction is ended, the product is cooled and the finished product $CaF_2$ nanoparticles and the oily organic matter with high boiling point are centrifugalized and separated.

Figure 2:
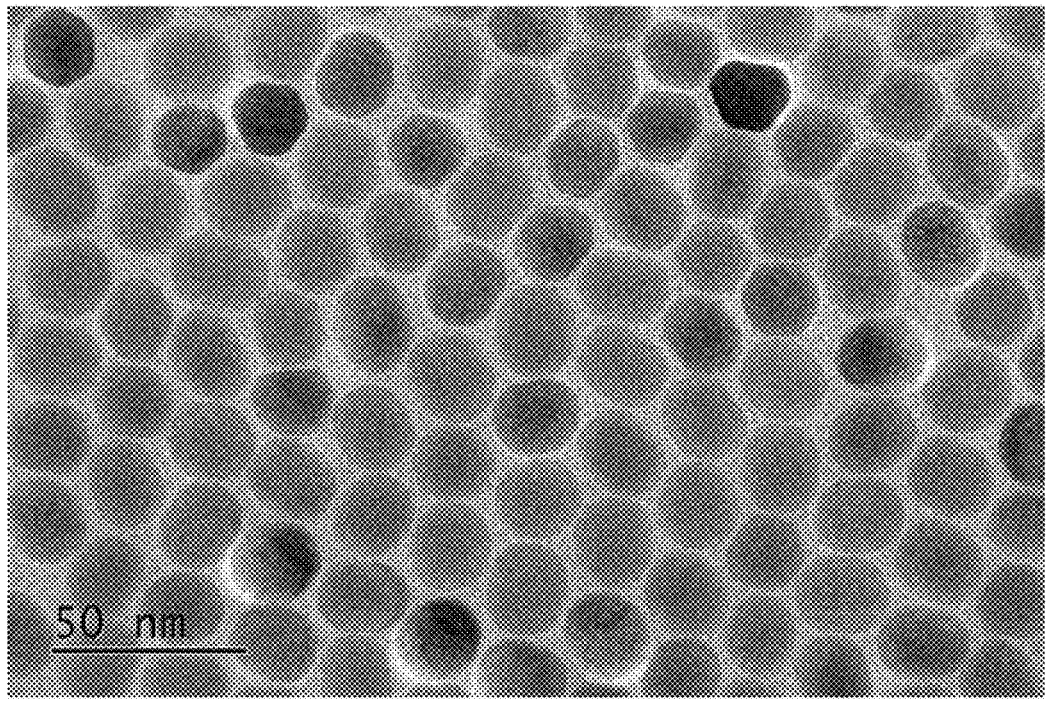
FIG. 2 is a scanning microscope morphology of $CaF_2$ powder prepared in embodiment 1 of the present invention.

(4) The finished product $CaF_2$ nanoparticles after centrifugalized and separated are washed with a small amount of ethanol and dried in vacuum at 60° C. for 12 h. the prepared $CaF_2$ nanomaterial powder is about 9.7 mol (about 760 g), and a scanning microscope morphology of the power is shown in FIG. 2; the average particle size is about 20 nm; the particles are uniform, and can be dispersed in a nonpolar organic solvent, and can also be modified to dissolve in water and a polar organic solvent.

(5) About 24.9 mol of hydrochloric acid obtained by evaporation in step (2) is collected and added to step (1) of a next circulation process.

(6) About 32.5 mol of the oily organic matter with high boiling point separated in step (3) is collected and added to step (2) of the next circulation process.

(7) The recovered substances collected in steps (5) and (6) are used to complement a small amount of hydrochloric acid (about 0.1 mol) and oleic acid (about 0.5 mol) lost in the circulation process; and then the above process step (1)-step (6) are repeated to cyclically prepare the $CaF_2$ nanomaterial, thereby truly realizing large-scale production.

In the acid dissolution process of step (1), the raw material of calcium can also be oxide and hydroxide. When carbonate is used as the raw material, $CO_2$ gas may be generated, and the acid addition speed needs to be reduced to avoid generating a large amount of gas. When the hydroxide is used as the raw material, water is generated in the product, and the initial concentration of the hydrochloric acid needs to be appropriately increased. Otherwise, on one hand, the original concentration of the acid is reduced, and the reaction speed is decreased. On the other hand, the increase in the amount of water increases the reduced pressure evaporation in step (2), increases energy consumption, and makes the process complicated. When $CaCl_2$ is used as the raw material, similar results can be obtained without step (1), but step (1) is still required in the next cycle.

The volatile acid is used in step (1), such as hydrochloric acid, perchloric acid, hydrobromic acid, nitric acid, formic acid, acetic acid and propionic acid. Because the volatile acid is recycled, excessive addition does not increase the generation cost, and the advantage of using excessive volatile acid is that the acid dissolution speed can be doubled, thereby increasing the yield per unit time and significantly reducing the generation cost. The addition amount of the volatile acid is more than 110% of the stoichiometric ratio, and the optimal addition amount is 150-1200% or even higher, which depends on the strength of the acid. The optimal addition amount of strong acids such as hydrochloric acid, perchloric acid, hydrobromic acid and nitric acid is 150-200%. The optimal addition amount of weak acids such as formic acid, acetic acid and propionic acid is 200-1000%. Non-volatile acids such as sulfuric acid and phosphoric acid shall not be used; otherwise, additional impurity removal processes may be required in the subsequent process, which makes the preparation process complicated.

The price of the acid and the mass production situation shall be considered in the selection of the type of the volatile acid. During small-scale production in laboratories, glassware is used and hydrochloric acid and nitric acid are selected to increase the acid dissolution speed, thereby reducing the cost. In industrial large-scale production, formic acid, acetic acid, and propionic acid or mixtures thereof can be used. Although the acid dissolution speed is lower than those of hydrochloric acid and nitric acid and the price is more expensive, because formic acid and acetic acid have good volatility, the decompression process of step (2) can be obviously accelerated. Meanwhile, formic acid and acetic acid have weak corrosivity and low requirements for the device, and reduce investment cost. When propionic acid is used alone, step (1) requires long time. Therefore, the comprehensive efficacy is better if formic acid or a mixture of formic acid and acetic acid is selected.

The oily organic matter with high boiling point in steps (2) and (3) can also be selected from $C_{10}$-$C_{18}$ organic long alkyl carboxylic acid or carboxylate, and the addition amount is 100-200% of the stoichiometric ratio. When the number of carbon chains of alkyl is short, such as $C_{10}$-$C_{15}$, the boiling point is low. At this moment, the reaction temperature of step (3) is relatively low (about 200° C.), and the particle size of the product is small. The prepared $CaF_2$ nanoparticles have a particle size of 2-4 nm, and low crystallinity. When the number of carbon chains of alkyl is long, such as $C_{16}$-$C_{18}$, the boiling point is high. At this moment, the reaction temperature of step (3) is can be increased to 280° C. or higher. The particle size of the product is large (particle size of 10-50 nm or even larger), but the product has high crystallinity and good performance. When the number of the carbon chains reaches or exceeds $C_{19}$, the product becomes a solid at room temperature, and must be heated and melted before use.

For some products which have high requirements for crystallinity, such as fluoride luminescent material, $C_{17}$-$C_{18}$ oily organic matter with high boiling point having long alkyl carbon chains is preferably used. However, $C_{17}$-$C_{18}$ oily organic matter with high boiling point has large viscosity, which is not beneficial for production operation. In order to reduce the viscosity of the solution, a certain amount of inert organic solvent with high boiling point is generally added into step (2) or (3), and does not participate in the reaction. Meanwhile, the inert organic solvents with high boiling point can also be used to dilute the concentration of reactants to facilitate the control of the particle size of the product. The organic solvents with high boiling point are $C_{10}$-$C_{18}$ alkane, amine, paraffin, high temperature silane and trioctyl phosphine oxide. The particle size, particle morphology and crystallinity of the product can also be changed by adjusting the quantity and types of the added oily organic matter with high boiling point and inert organic solvents with high boiling point.

The crystallinity of the product can be obviously increased by adding not more than 10 mol % of alkali metal fluoride AF or $AHF_2$, such as NaF, into $NH_4F$, but the product contains a slight amount of $Na^+$ ions. Not more than 5 mol % of fluoroborate, trifluoromethanesulfonate or mixture thereof can also be added for adjusting the polarity, which can shorten the moistening time by about 25%. The fluorine source can also use organic fluoride, such as trifluoroacetic acid and salt thereof, tetramethylammonium fluoride, and tetrabutylammonium fluoride. The effect is better than $NH_4F$, but the cost is higher.

The preparation methods of fluoride of other elements, such as Be, Mg, Sr, Ba, Zn, Cd, Mn or combination thereof, are the same as that of $CaF_2$. The preparation processes and methods of other ternary fluorides such as $AMF_3$ are similar to those of embodiment 1, as long as the stoichiometric ratio of the initial raw material is changed: AF is added to the fluorine source; the molar ratio of $NH_4F$ to AF is 2:1; and the strong polar organic solvents are methylamine and methanol (volume ratio of 1:1) to reduce the alkalinity of the strong polar organic solvents accordingly.

Because various reagents are recycled, the beneficial effects of the present embodiment are: the closed-loop large-scale preparation method can reduce the production cost by more than 75%, and at the same time, the waste liquid treatment cost can also be reduced due to no discharge. In addition, the method can also increase the yield of device per unit volume by more than 10 times, and can reduce the fixed asset investment by more than 50%.

Embodiment 2

(1) 5 mol of $La_2O_3$ is weighed; 150 mL of water is added; the material is dissolved in 60 mol of formic acid (99%) solution; the solution is heated to about 100° C., refluxed until the solution is transparent, and filtered to remove insoluble substances.

(2) After evaporating the remaining formic acid (30 mol) under reduced pressure at 50° C. (initial relative vacuum of −0.01 MPa, and final relative vacuum of −0.09 MPa), 33 mol of palmitic acid is added while hot; 60 mol of inert organic solvents with high boiling point, i.e., octadecene and trioctylamine (molar ratio of 1:1) is added at the same time; and the combined palmitic acid (about 30 mol) is continuously evaporated under reduced pressure at 140° C. (vacuum of 3000 Pa), and converted into lanthanum palmitate.

(3) 30 mol of tetrabutylammonium fluoride is added to the above lanthanum palmitate to generate nano-$LaF_3$ at 60° C.; water and a flux are evaporated at temperature not higher than 130° C. (vacuum of 10 Pa); then Ar is filled and kept (weak positive pressure); meanwhile, the reaction temperature is increased to 330° C. to react for 0.5 h to increase the crystallinity of the product; and after the reaction is ended, the finished product $LaF_3$ nanoparticles and the oily organic matter with high boiling point are centrifugalized and separated.

Figure 3:
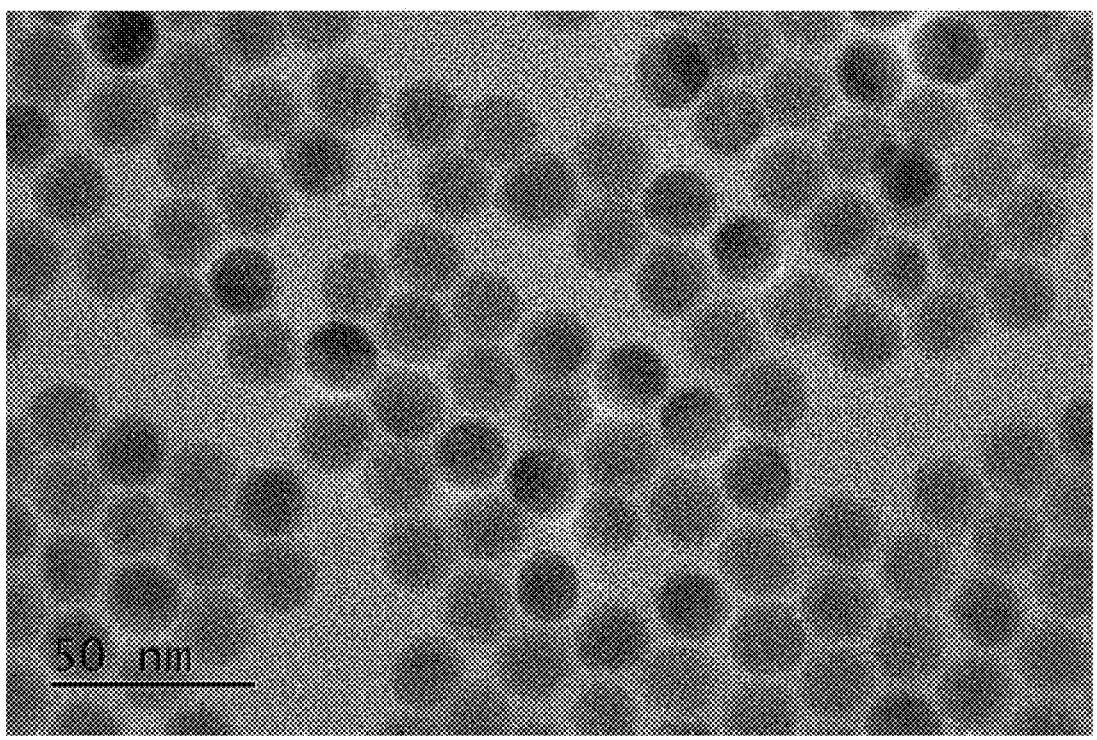
FIG. 3 is a scanning microscope morphology of $LaF_3$ powder prepared in embodiment 2 of the present invention.

(4) The finished product $LaF_3$ nanoparticles after centrifugalized and separated are washed with a small amount of ethanol and dried in vacuum at 60° C. for 12 h. The prepared $LaF_3$ nanomaterial powder is about 9.5 mol; the particle size is about 15 nm; and a scanning microscope morphology of the power is shown in FIG. 3.

(5) About 59 mol of formic acid obtained in step (2) is collected and added to step (1) of a next circulation process.

(6) About 92 mol of the oily organic matter with high boiling point obtained in step (3) is collected and added to step (2) of the next circulation process.

(7) Steps (1)-(6) are repeated, and meanwhile, formic acid (about 1 mol) and palmitic acid (about 1 mol) are complemented to obtain about 9.5 mol of $LaF_3$ nanomaterial powder.

The fluorine source can also be $NH_4F$. At this moment, methylamine needs to be added and fully moistened. If not more than 25 mol % of AF is mixed into $NH_4F$, the crystallinity of the product can be improved and the elimination of ammonia is beneficial. However, it must be ensured that the content of is not more than 25 mol % in the second circulation process (step 7) and subsequent cyclic preparation processes; otherwise, the impurity phase may easily appear. If not more than 15 mol % of $AHF_2$ is mixed into $NH_4F$ and methanol is added and fully moistened, the effect is better. Other fluorine sources also have the similar effect, but the strong polar organic solvent that increases the wettability should be adjusted according to the types of the fluorine sources. Other various influencing factors in the preparation process are similar to those in embodiment 1, but the reaction temperature is higher than that of embodiment 1.

If weak negative pressure is maintained in the preparation process, LaOF nanomaterial powder can be obtained.

The preparation methods of fluoride $REF_3$ and oxyfluoride REOF of other elements, such as Ce, Pr, Nd, Sin, Eu, Gd, Tb, Dy, Ho, Er, Tin, Yb, Lu, Y, Sc, Al, Ga, Bi or combination thereof, are equivalent to those of $LaF_3$ and LaOF.

Embodiment 3

(1) 5 mol of $Y_2O_3$ is weighed and dissolved in 100 mL of glacial acetic acid solution (99%); the solution is heated to about 110° C., refluxed until the solution is transparent, and filtered to remove insoluble substances.

(2) After evaporating the remaining glacial acetic acid (about 70 mol) under reduced pressure at 80° C. (initial relative vacuum of −0.01 MPa, and final relative vacuum of −0.09 MPa), 35 mol of linoleic acid is added; 25 mol of inert organic solvents with high boiling point, i.e., oleylamine and trioctylamine (molar ratio of 1:1) is added at the same time; and the combined glacial acetic acid (about 30 mol) is continuously evaporated under reduced pressure at 140° C. (vacuum of 1500 Pa), and converted into rare earth linoleate.

(3) Mixed powder of sodium acetate (about 18 mol) and $NH_4F$ (about 37 mol) is processed to a particle size of about 1 μm; at the same time, 250 mL of methylamine is added and fully moistened; the above rare earth linoleate is transferred into the mixture, and stirred at room temperature for 1 h; then volatile organic matter is evaporated under reduced pressure at temperature not higher than 150° C. (vacuum of 10 Pa); then Ar is filled and weak positive pressure is kept; meanwhile, the reaction temperature is increased to 300° C. to react for 1 h to generate nano-$NaYF_4$ and increase the crystallinity of the product; and after the reaction is ended, the finished product $NaYF_4$ nanoparticles and the oily organic matter with high boiling point are centrifugalized and separated.

Figure 4:
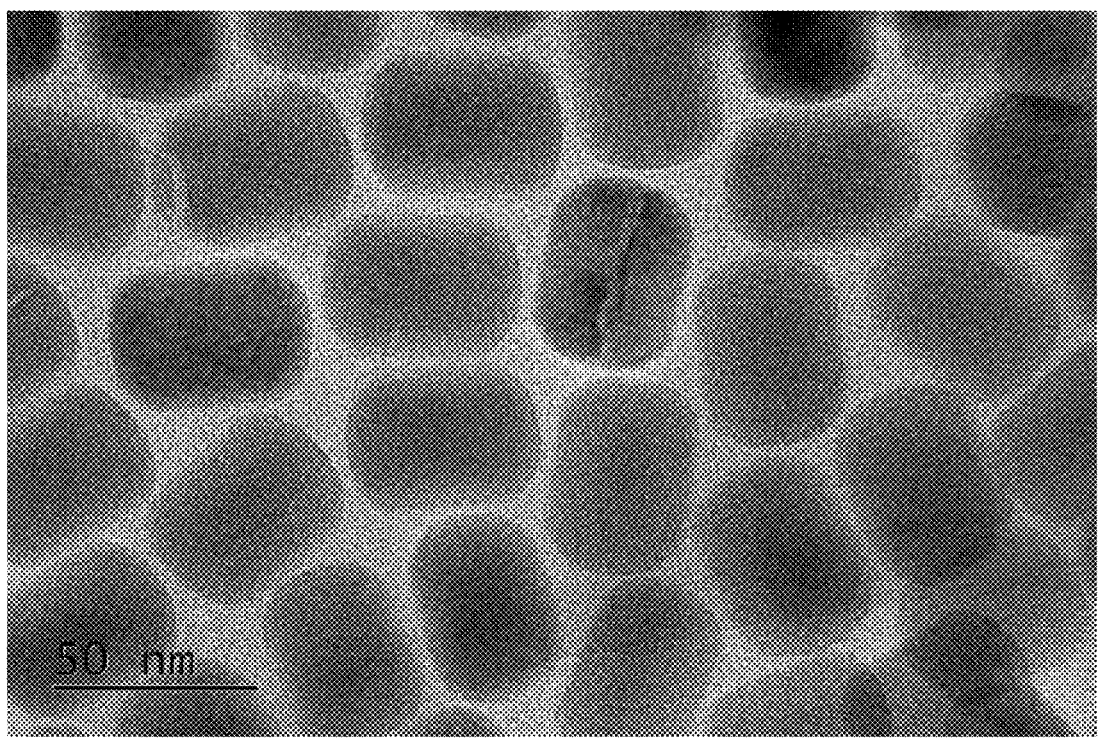
FIG. 4 is a scanning microscope morphology of $NaYF_4$ powder prepared in embodiment 3 of the present invention.

(4) The finished product $NaYF_4$ nanoparticles after centrifugalized and separated are washed with a small amount of ethanol and dried in vacuum at 60° C. for 12 h. The prepared $NaYF_4$ nanomaterial powder is about 9.5 mol (about 1780 g); the particle size is about 50 nm; and a scanning microscope morphology of the power is shown in FIG. 4.

(5) About 99 mol of glacial acetic acid obtained in step (2) is collected and added to step (1) of a next circulation process.

(6) About 59 mol of the oily organic matter with high boiling point obtained in step (3) is collected and added to step (2) of the next circulation process.

(7) Steps (1)-(6) are repeated, and meanwhile, methylamine (about 1 mol) and linoleic acid (about 1 mol) are complemented; and the addition amount of the sodium acetate in step (3) is changed to 10 mol, and other parameters are unchanged to obtain about 9.5 mol of $NaYF_4$ nanomaterial powder.

The difference from embodiment 1 and embodiment 2 is that in the circulation process, alkali metal ions need to be introduced, and a certain ratio shall be maintained between the alkali metal ions and the fluorine source. The particle size of the product prepared when the ratio is large is small, and the particle size of the product prepared when the ratio is small is large. In order to make the particle size of the product consistent, the ratio needs to be unchanged in the process of preparing a product with a certain particle size, and the ratio needs to be adjusted with the change of the particle size of the product. Especially in multiple circulation processes, the addition amounts of the alkali metal ions and the fluorine source must be adjusted. The types of the alkali metal ions (one or more of Li, Na, K, Rb or Cs) are different, and the crystal phases of the products are different.

The preparation methods of fluoride of other elements, such as Ce, Pr, Nd, Sin, Eu, Gd, Tb, Dy, Ho, Er, Tin, Yb, Lu, Y, Sc, Al, Ga, Bi or combination thereof, are the same as that of $NaYF_4$. The preparation processes and methods of other similar ternary fluorides such as $MREF_5$, $M_2REF_7$, $MRE_2F_8$ and $MRE_4F_{14}$ are the same as those of embodiment 3. However, to add the process of step (1) of embodiment 1, in other respects, only the stoichiometric ratio of the initial raw material needs to be changed.

The method of the present invention can also be used to realize the doping of different ions and core-shell structure by means of adding the raw materials respectively in the acid dissolution stage, and other steps are the same. To fully explain the beneficial effects of the present invention, embodiment 4 of the present invention uses a reaction vessel with the same volume as that of reference document 4.

Embodiment 4

(1) 0.3 mol of $RE_2O_3$ (including 0.234 mol of $Y_2O_3$, 0.06 mol of $Yb_2O_3$ and 0.006 mol of $Er_2O_3$) is weighed and dissolved in 10.0 mol of glacial acetic acid solution (99%); the solution is heated to about 110° C., refluxed until the solution is transparent, and filtered to remove insoluble substances.

(2) After evaporating the remaining glacial acetic acid (about 8.2 mol) under reduced pressure at 130° C. (initial relative vacuum of −0.01 MPa, and final relative vacuum of −0.09 MPa), 1.8 mol of linoleic acid is added; 0.2 mol of inert organic solvent with high boiling point, i.e., octadecene is added at the same time to adjust the viscosity of the reaction solution; and the combined glacial acetic acid (about 1.8 mol) is continuously evaporated under reduced pressure at 160° C. (vacuum of 1 Pa), and converted into rare earth linoleate.

(3) Mixed powder of sodium acetate (about 1.08 mol) and $NH_4F$ (about 1.92 mol) is processed to a particle size of about 1 μm; at the same time, 20 mL of methylamine is added and fully moistened; the above rare earth linoleate is transferred into the mixture, and stirred at room temperature for 1 h; then volatile organic matter is evaporated under reduced pressure at temperature not higher than 150° C. (vacuum of 10 Pa); then Ar is filled and weak positive pressure is kept; meanwhile, the reaction temperature is increased to 180° C. to react for 5 h to generate nano-$NaYF_4$:Yb,Er luminescent particles; and after the reaction is ended, the particles are cooled to room temperature for use.

(4) 0.15 mol of $Y_2O_3$ is weighed and added in about 10.0 mol of glacial acetic acid collected in step (2); the solution is heated to about 110° C., refluxed until the solution is transparent, and filtered to remove insoluble substances.

(5) After evaporating the remaining glacial acetic acid (about 9.1 mol) under reduced pressure at 80° C. (initial relative vacuum of −0.01 MPa, and final relative vacuum of −0.09 MPa), 0.9 mol of linoleic acid is added; 0.1 mol of inert organic solvent with high boiling point, i.e., octadecene is added at the same time to adjust the viscosity of the reaction solution; and the combined glacial acetic acid (about 0.9 mol) is continuously evaporated under reduced pressure at 90-140° C. (vacuum of 2000-10 Pa), and converted into rare earth linoleate.

(6) Mixed powder of sodium acetate (about 0.54 mol) and $NH_4F$ (about 0.96 mol) is processed to a particle size of about 1 μm; at the same time, 10 mL of methylamine is added and fully moistened; the $NaYF_4$:Yb,Er obtained in the above step (3) is transferred into the mixture, and stirred at room temperature for 1 h; then volatile organic matter is evaporated under reduced pressure at temperature not higher than 150° C. (vacuum of 10 Pa); then Ar is filled and weak positive pressure is kept; meanwhile, the reaction temperature is increased to 280° C. to react for 1 h; after the reaction is ended, the product is cooled to room temperature; and the finished product $NaYF_4$:Yb,Er@$NaYF_4$ core-shell nano-luminescent particles and the oily organic matter with high boiling point are centrifugalized and separated.

Figure 5:
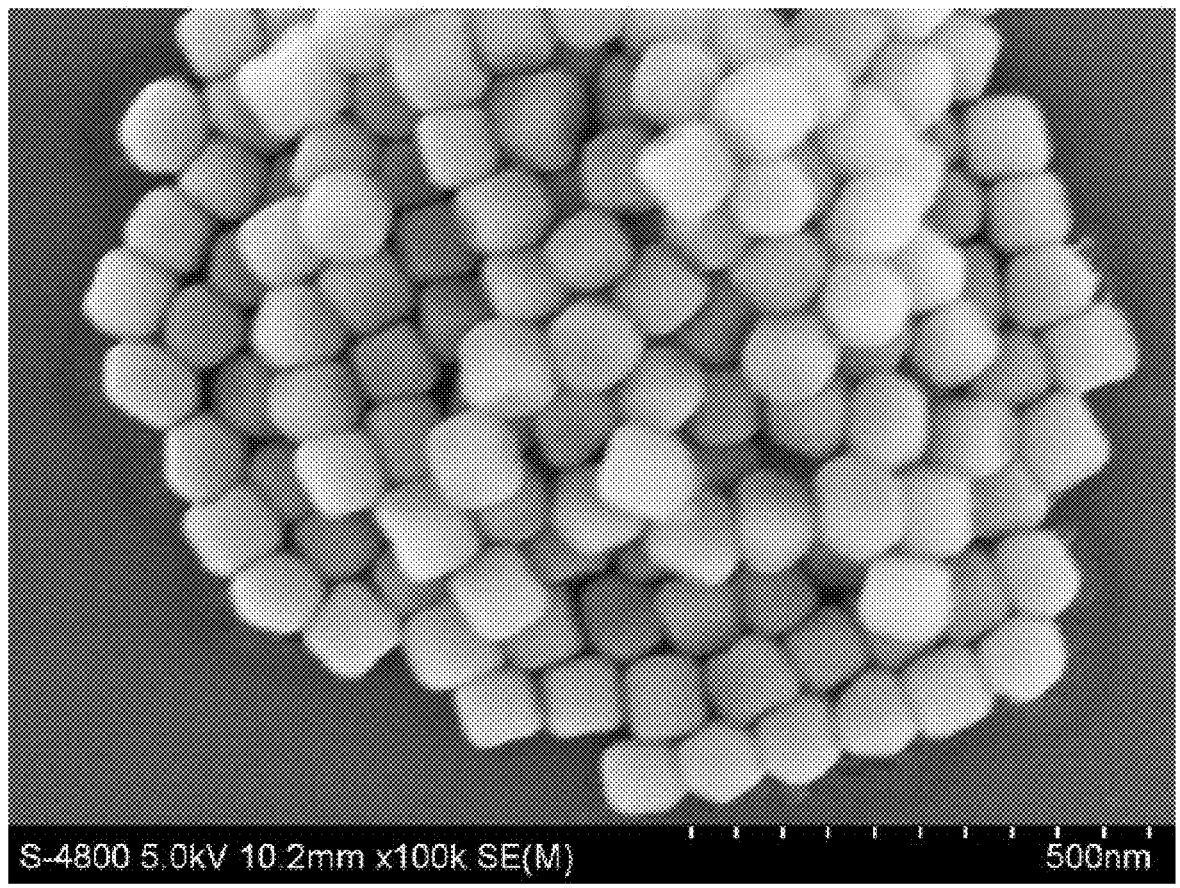
FIG. 5 is a scanning microscope morphology of $NaYF_4$:Yb,Er@$NaYF_4$ powder prepared in embodiment 4 of the present invention.

(7) The finished product nanoparticles after centrifugalized and separated are washed with a small amount of ethanol and dried in vacuum at 60° C. for 12 h. The prepared $NaYF_4$:Yb,Er@$NaYF_4$ core-shell nano-luminescent particle power is about 0.85 mol (about 172 g), has a particle size of about 80 nm, and shines in bright green under 980 nm excitation radiation. A scanning microscope morphology of the power is shown in FIG. 5.

(8) About 9.9 mol of glacial acetic acid obtained in step (5) is collected and added to step (1) of a next circulation process.

(9) About 2.9 mol of the oily organic matter with high boiling point obtained in step (3) is collected; and meanwhile, 0.1 mol of oleic acid is complemented and added to step (2) of the next circulation process.

(10) Steps (1)-(9) are repeated, but the addition amounts of the sodium acetate in step (3) and step (5) are changed to 0.6 mol and 0.3 mol, and other parameters are unchanged to obtain about 0.85 mol of $NaYF_4$:Yb,Er@$NaYF_4$ core-shell nano-luminescent particle power.

For further comparison, the reference document 1 is enlarged by 100 times, the reference document 2 is enlarged by 2 times, the reference document 3 is enlarged by 2 times, and the data of the reference document 4 is directly adopted. Because the products of the reference documents 1-4 are the same as that of embodiment 4, and the reactor volume is also the same, respective advantages are conveniently compared intuitively. The results are listed in the following table.

| Items | Magnification | Reactor Volume | Reaction Solution Volume | Product | Raw Material Cost per Unit Product |
|---|---|---|---|---|---|
| Reference document 1 | ×100 | 2 L | ~1.44 L | ~5 g | 160.4 (relative to embodiment 4) |
| Reference document 2 | ×2 | 2 L | ~1.32 L | ~5 g | 170.1 (relative to embodiment 4) |
| Reference document 3 | ×2 | 2 L | ~0.9 L | ~5 g | 110.9 (relative to embodiment 4) |
| Reference document 4 | ×1 | 2 L | ~1.1 L | ~58 g | 13.5 (relative to embodiment 4) |
| Embodiment 4 | ×1 | 2 L | ~1.2 L | ~172 g | 1 |

It can be seen from the above table that the production efficiency of the present invention is about 3 times higher than that of the reference document 4, and 30 times higher than that of the reference documents 1-3. The raw material cost per unit product (which is set as 1 in embodiment 4) is about 13 times lower than that of the reference document 4, and 100 times lower than that of the reference documents 1-3.

Embodiment 5

(1) 0.5 mol of $Gd_2O_3$ is weighed and dissolved in a mixed solution of 3.0 mol of formic acid (99%) and 6.0 mol of glacial acetic acid (99%); the solution is heated to about 110° C., refluxed until the solution is transparent, and filtered to remove insoluble substances.

(2) After evaporating the remaining formic acid and acetic acid under reduced pressure at 80° C., 5.3 mol of lauric acid is added; 6.7 mol of inert organic solvent with high boiling point, i.e., octadecene is added at the same time to reduce the viscosity of the reaction solution; and the combined volatile acid is continuously evaporated under reduced pressure at 140° C., and converted into yttrium Laurate.

(3) 4.0 mol of $NH_4F$ powder is added; 4.5 mol of NaOH is added; Ar is filled; meanwhile, the reaction temperature is increased to 290° C. to react for 1 h to generate nano-$NaGdF_4$ and increase the crystallinity of the product; and after the reaction is ended, the product is cooled; and the finished product $NaGdF_4$ nanoparticles and the oily organic matter with high boiling point are centrifugalized and separated.

(4) The finished product $NaGdF_4$ nanoparticles after centrifugalized and separated are washed with a small amount of ethanol and dried in vacuum at 60° C. for 12 h. The prepared $NaGdF_4$ nanomaterial powder is about 0.95 mol and has a particle size of about 12 nm.

(5) About 8.9 mol of formic acid and acetic acid obtained in step (2) is collected and added to step (1) of a next circulation process.

(6) About 11.9 mol of the oily organic matter with high boiling point obtained in step (3) is collected; and meanwhile, 0.1 mol of oleic acid is complemented and added to step (2) of the next circulation process.

(7) Steps (1)-(6) are repeated to obtain about 0.95 mol of $NaGdF_4$ nanomaterial powder. After repeated circulation, large-scale production can be achieved.

The invention claimed is:

1. An environmentally friendly large-scale preparation method of fluoride nanomaterial, wherein the fluoride is $MF_2$, $REF_3$ or compound fluoride; the compound fluoride is one or more than one of $AMF_3$, $AREF_4$, $A_2REF_5$, $A_3REF_6$, $ARE_2F_7$, $A_2RE_2F_8$, $ARE_3F_{10}$, $ARE_7F_{22}$, $A_5RE_9F_{32}$, $MREF_5$, $M_2REF_7$, $MRE_2F_8$, $MRE_4F_{14}$ or REOF; M is one or more than one of Be, Mg, Ca, Sr, Ba, Zn, Cd or Mn; RE is one or more than one of La, Ce, Pr, Nd, Sm, Eu, Gd, Tb, Dy, Ho, Er, Tm, Yb, Lu, Y, Sc, Al, Ga or Bi; A is one or more than one of Li, Na, K, Rb or Cs, wherein the method comprises the following specific preparation steps:

step 1: taking oxide, carbonate, basic carbonate or hydroxide containing M and/or RE as raw material; adding volatile acid a to the raw material; or directly taking volatile acid salt containing M and/or RE as raw material; heating to reflux to dissolve the raw material; and converting the raw material into water-soluble salt to obtain a water-soluble salt solution b; filtering precipitates which may exist in the solution;

step 2: conducting an evaporation process on the water-soluble salt solution b in step 1 to evaporate excess volatile acid a and water which do not participate in the reaction, wherein evaporation temperature is 50-130° C. and relative vacuum is −(0.01-0.09) MPa; then, adding oily organic matter c with high boiling point to continue evaporation under reduced pressure; replacing the volatile acid bound with M and/or RE, wherein evaporation temperature is 80-160° C. and vacuum is 1-3000 Pa; converting all the water-soluble salt b into oil-soluble precursor salt to obtain an oil-soluble salt solution d;

step 3: adding oil-infiltrating fluorine source e to the oil-soluble salt solution d obtained in step 2; when the product is compound fluoride, adding an oil-infiltrating compound of A; conducting a heating reaction at a temperature not higher than 80° C. to generate nanofluoride; then heating and crystallizing the nanofluoride under the protection of inert gas at heating temperature of 180-330° C. and reaction time of 0.5-5 h; after cooling, centrifuging and washing the product; and separating the product of fluoride nanoparticles from the oily organic matter c with high boiling point;

step 4: collecting the evaporated volatile acid a in step 2 for use in the acid dissolution process of step 1;

step 5: collecting the oily organic matter c with high boiling point in step 3 for use in the reduced pressure evaporation process of step 2.

2. The environmentally friendly large-scale preparation method of fluoride nanomaterial according to claim 1, wherein the volatile acid a is one or a mixture of more than one of hydrochloric acid, perchloric acid, hydrobromic acid, nitric acid, formic acid, acetic acid, and propionic acid; a stoichiometric ratio of the volatile acid a to the raw material in step 1 is greater than 110%.

3. The environmentally friendly large-scale preparation method of fluoride nanomaterial according to claim 1, wherein the oily organic matter c with high boiling point is one or a mixture of more than one of $C_{10}$-$C_{18}$ organic long-chain alkyl carboxylic acid and carboxylate, or one or a mixture of more than one of other organic long-chain alkyl carboxylic acid or carboxylate with melting point not higher than 30° C. and boiling point not lower than 180° C.; the addition amount of the oily organic matter c with high boiling point is 100-200 mol % of the stoichiometric ratio of M and/or RE.

4. The environmentally friendly large-scale preparation method of fluoride nanomaterial according to claim 3, wherein the oily organic matter c with high boiling point is one or a mixture of more than one of acid, salt corresponding to the acid, and amine corresponding to the acid, and the acid is linoleic acid, oleic acid, palmitic acid, stearic acid, cetylic acid or lauric acid.

5. The environmentally friendly large-scale preparation method of fluoride nanomaterial according to claim 3, wherein in the steps 2 and 3, an inert organic solvent with high boiling point can also be added, which does not participate in the reaction process, but is only used to dilute the concentration of the reactants, which is convenient for controlling the particle size of the product and the particle growth process; the added inert organic solvent with high boiling point is one or a mixture of more than one of $C_{10}$-$C_{18}$ alkanes, amines, paraffins and trioctyl phosphine oxide.

6. The environmentally friendly large-scale preparation method of fluoride nanomaterial according to claim 1, wherein the oil-infiltrating fluorine source e is organic or inorganic fluoride with an infiltration angle less than 65°; an infiltration medium is the oily organic matter c with high boiling point; and the addition amount of the oil-infiltrating fluorine source e is 90%-120% of the sum of the stoichiometric ratios of A+M+RE.

7. The environmentally friendly large-scale preparation method of fluoride nanomaterial according to claim 6, wherein the inorganic fluoride is one or a mixture of more than one of alkali metal fluoride, fluoroborate and triflate; the alkali metal fluoride is $NH_4F$, AF or $AHF_2$; the organic fluoride is one or a mixture of more than one of trifluoroacetic acid, salt of trifluoroacetic acid, tetramethylammonium fluoride and tetrabutylammonium fluoride.

8. The environmentally friendly large-scale preparation method of fluoride nanomaterial according to claim 6, wherein in the steps 2 and 3, an inert organic solvent with high boiling point can also be added, which does not participate in the reaction process, but is only used to dilute the concentration of the reactants, which is convenient for controlling the particle size of the product and the particle growth process; the added inert organic solvent with high boiling point is one or a mixture of more than one of $C_{10}$-$C_{18}$ alkanes, amines, paraffins and trioctyl phosphine oxide.

9. The environmentally friendly large-scale preparation method of fluoride nanomaterial according to claim 6, wherein the particle size of the oil-infiltrating fluorine source e is controlled, and meanwhile, a strong polar organic solvent is added to improve the infiltrating property, so as to promote the dissociation of the oil-infiltrating fluorine source e in the oily organic matter c with high boiling point; the strong polar organic solvent is organic acid, alcohol or alkali with carbon chain length not more than 2; the addition amount is not more than 10% of the volume ratio of the oily organic matter c with high boiling point; and the polarity and acid-base property are consistent with those of the oil-infiltrating fluorine source e.

10. The environmentally friendly large-scale preparation method of fluoride nanomaterial according to claim 1, wherein in the steps 2 and 3, an inert organic solvent with high boiling point can also be added, which does not participate in the reaction process, but is only used to dilute the concentration of the reactants, which is convenient for controlling the particle size of the product and the particle growth process; the added inert organic solvent with high boiling point is one or a mixture of more than one of $C_{10}$-$C_{18}$ alkanes, amines, paraffins, and trioctyl phosphine oxide.

* * * * *